C. G. KOPPITZ.
PROCESS OF INTERCONVERTING HIGH POTENTIAL POLYPHASE AND DIRECT ELECTRIC CURRENTS AND TRANSMITTING POWER.
APPLICATION FILED OCT. 10, 1912.

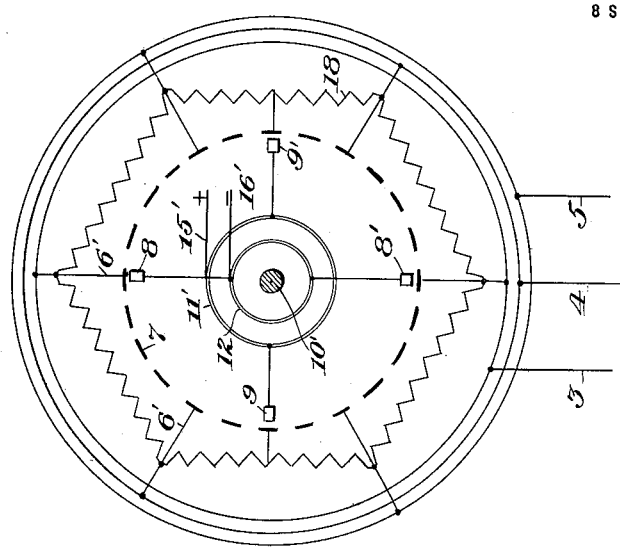

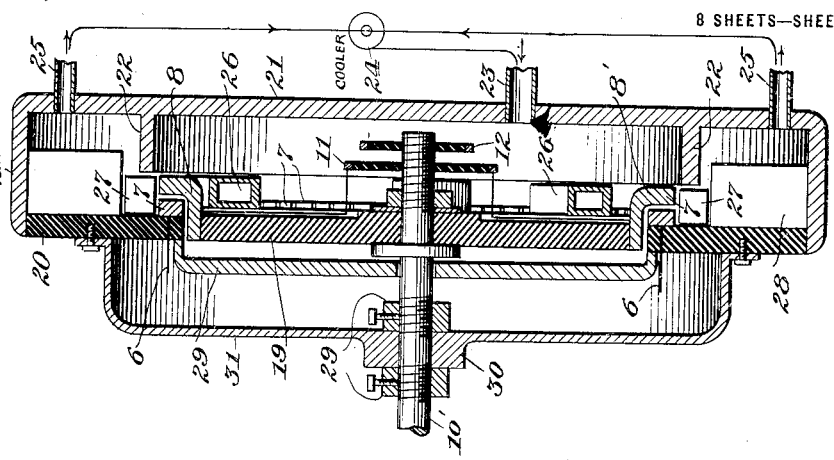
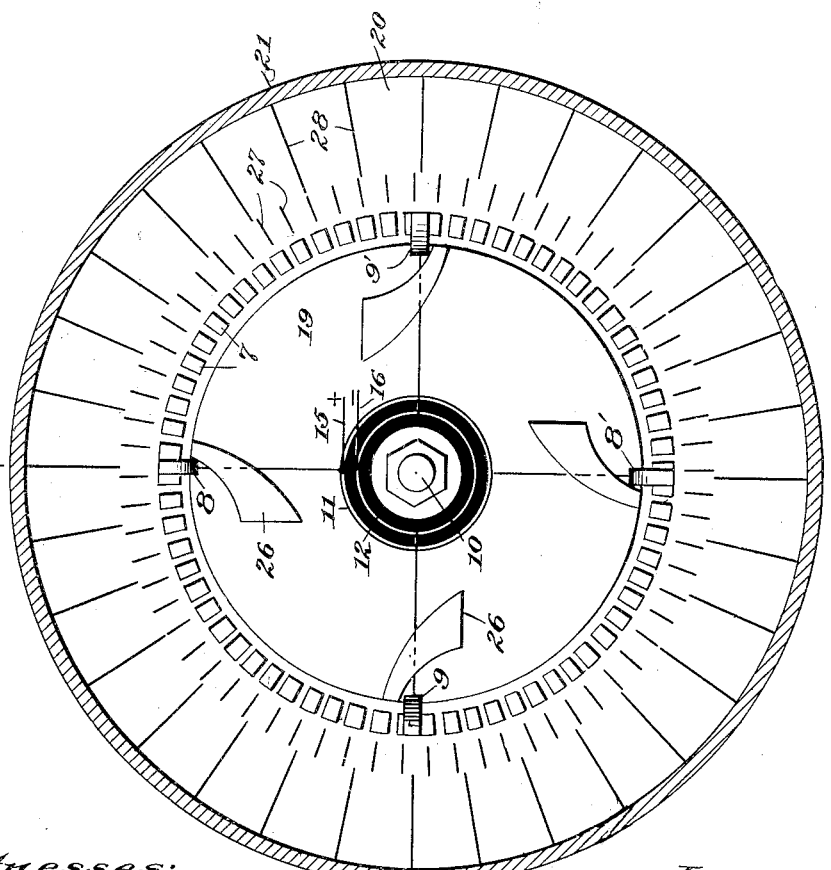

1,245,356.

Patented Nov. 6, 1917.
8 SHEETS—SHEET 3.

Witnesses:
E. Daniels
N. P. Leonard.

Inventor:
Carl G. Koppitz,
by Byrnes, Townsend & Dickinstein,
Attys.

C. G. KOPPITZ.
PROCESS OF INTERCONVERTING HIGH POTENTIAL POLYPHASE AND DIRECT ELECTRIC CURRENTS AND TRANSMITTING POWER.
APPLICATION FILED OCT. 10, 1912.

1,245,356.

Patented Nov. 6, 1917.
8 SHEETS—SHEET 4.

Witnesses:
E. Davies
N. P. Leonard.

Inventor:
Carl G. Koppitz,
by Byrnes, Townsend & Beckmatin,
Attys.

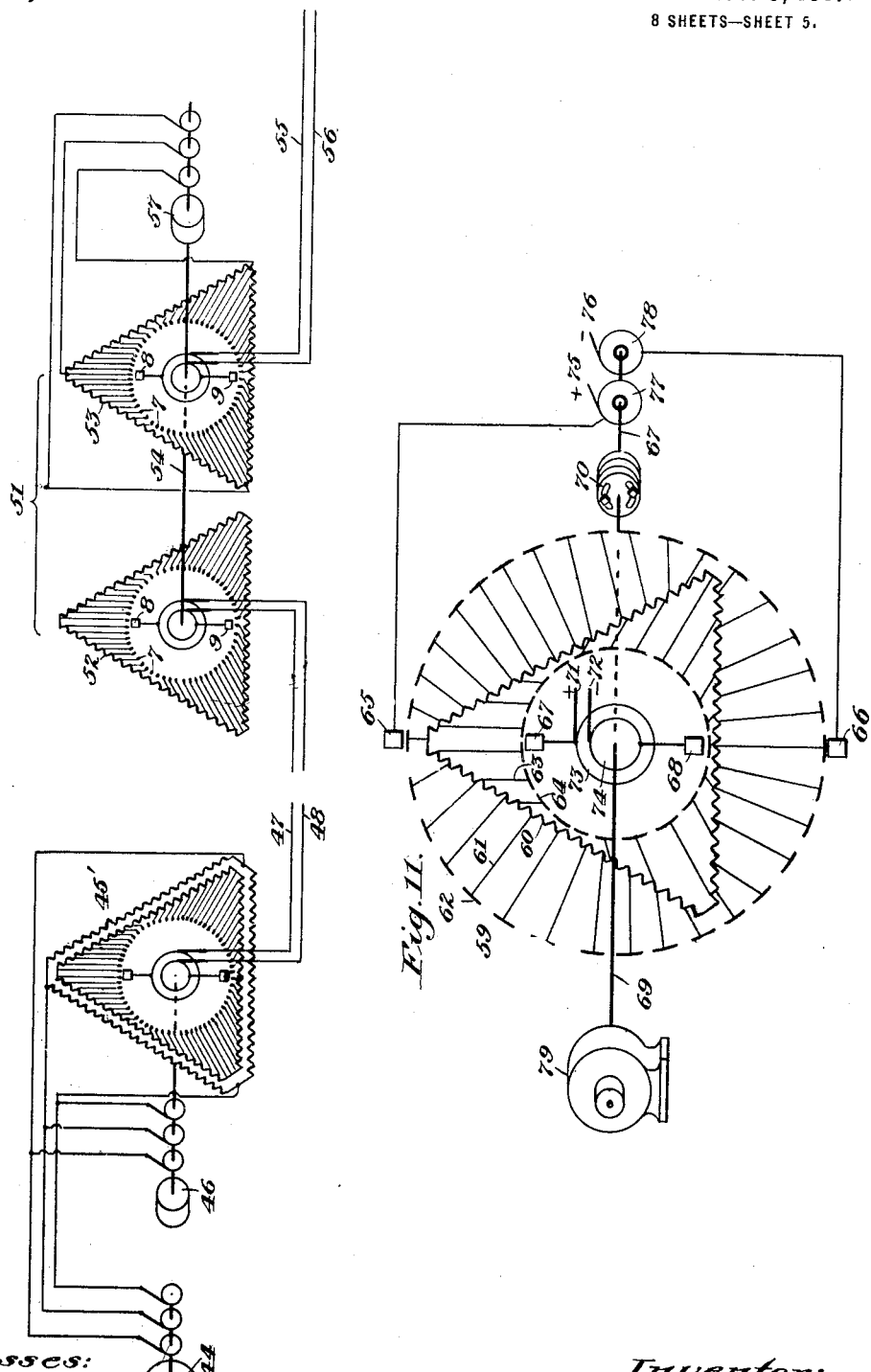

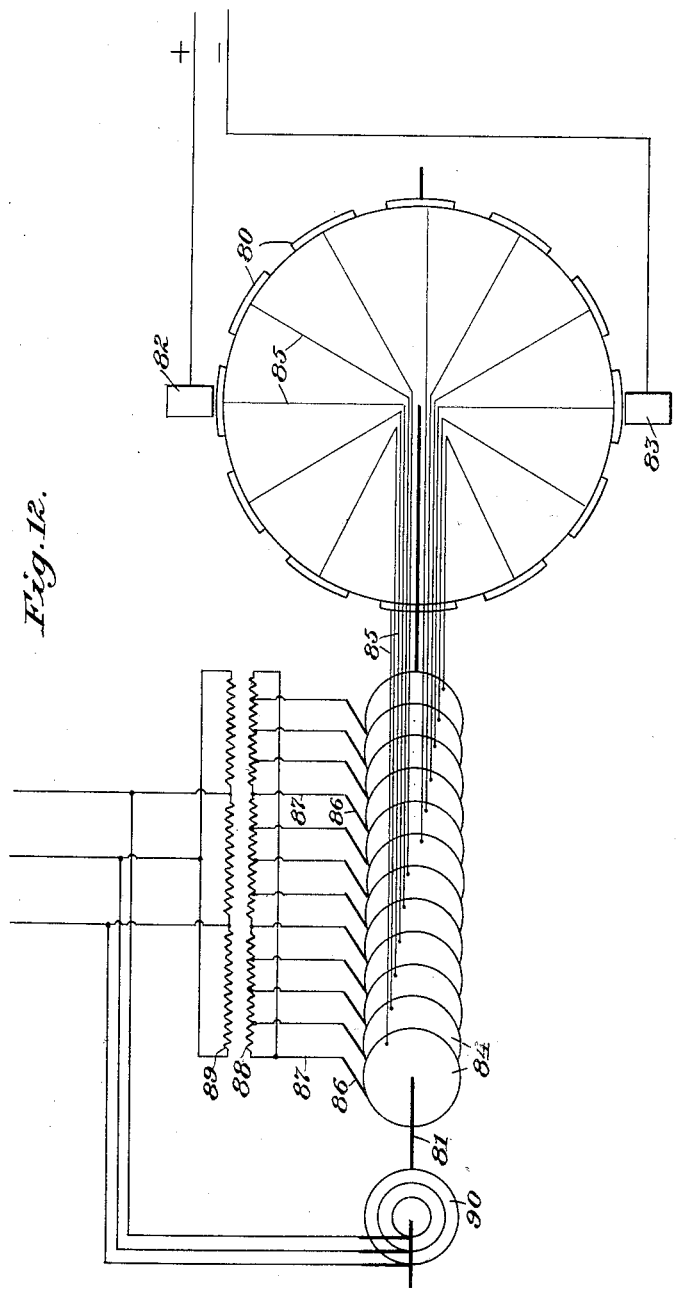

C. G. KOPPITZ.
PROCESS OF INTERCONVERTING HIGH POTENTIAL POLYPHASE AND DIRECT ELECTRIC CURRENTS AND TRANSMITTING POWER.
APPLICATION FILED OCT. 10, 1912.

1,245,356.

Patented Nov. 6, 1917.
8 SHEETS—SHEET 7.

Witnesses:
E. Daniels
N. P. Leonard

Inventor:
Carl G. Koppitz,
by Byrnes, Townsend & Bickelstein,
Attys.

C. G. KOPPITZ.
PROCESS OF INTERCONVERTING HIGH POTENTIAL POLYPHASE AND DIRECT ELECTRIC CURRENTS
AND TRANSMITTING POWER.
APPLICATION FILED OCT. 10, 1912.
1,245,356.
Patented Nov. 6, 1917.
8 SHEETS—SHEET 8.
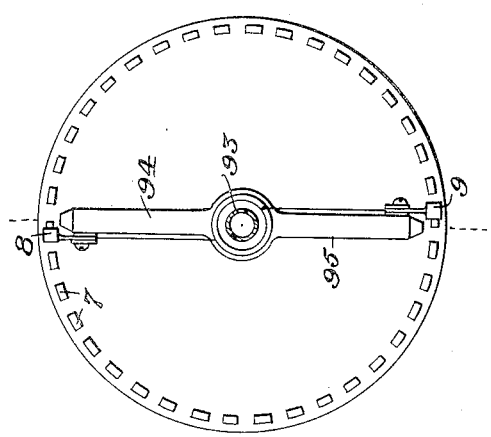
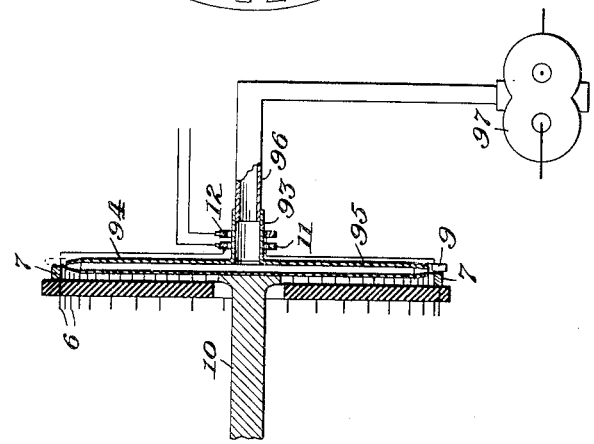
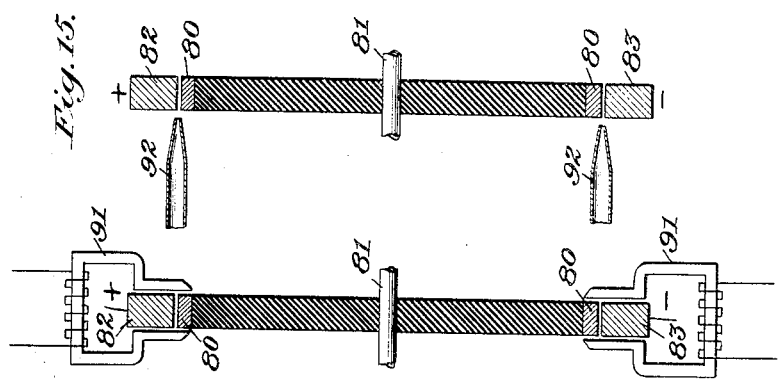

UNITED STATES PATENT OFFICE.

CARL G. KOPPITZ, OF YOUNGSTOWN, OHIO.

PROCESS OF INTERCONVERTING HIGH-POTENTIAL POLYPHASE AND DIRECT ELECTRIC CURRENTS AND TRANSMITTING POWER.

1,245,356.  Specification of Letters Patent.  Patented Nov. 6, 1917.

Continuation in part of application Serial No. 646,988, filed August 11, 1911. This application filed October 10, 1912. Serial No. 724,963.

*To all whom it may concern:*

Be it known that I, CARL G. KOPPITZ, a citizen of the United States, residing at Youngstown, in the county of Mahoning and State of Ohio, have invented certain new and useful Improvements in Processes of Interconverting High - Potential Polyphase and Direct Electric Currents and Transmitting Power, of which the following is a specification.

This process relates especially to the interconversion of alternating and direct currents of sufficiently high potential to permit unidirectional currents to be transferred as arcs between the separated fixed segments and revolving brushes of a collector, for example currents having a potential of from one or two thousand up to several hundred thousand volts. The invention involves the flow of polyphase currents to or from and through a fixed winding, and the flow of direct currents to or from the collector-brushes, pulses of direct current jumping across the spaces between these brushes and fixed segments connected by spaced leads to different portions of a closed winding in inductive relation to or included in the polyphase circuits, the brushes rotating in synchronism with the cycles of alternating current thereby remaining at a predetermined point on the E. M. F. wave. The segments and brushes are preferably cooled and the arcs extinguished by blasts of pre-cooled non-oxidizing gas, caused to impinge upon them by fans carried by the brushes, the portions of gas heated by the several arcs being electrically insulated as they flow away from the segments and being delivered to a separate cooler.

The process also relates to the transmission of electric power, alternating current being generated and converted into direct current at one point, transmitted to another point by two wires or by a single wire and the ground, and there re-converted into alternating current.

Suitable apparatus for carrying out the invention is shown in the accompanying drawings, in which—

Figure 1 is a diagrammatic view of the electrical features of a three-phase converter having separate transformer windings for polyphase and direct current, and two collector-brushes of opposite polarity;

Fig. 2 is a similar view of a three-phase converter having a single auto-transformer winding, subdivided into two windings connected in parallel for each phase, and provided with two pairs of collector-brushes, connected in parallel;

Figs. 3 and 4 are transverse vertical sections, in planes at right angles to each other, of the preferred current-collecting mechanism;

Fig. 10 is a diagrammatic view of a system for generating three-phase current, converting, transmitting, reconverting and for changing it at the receiving station into direct current of any potential;

Fig. 11 is a diagrammatic view of a converter for changing the voltage of a direct current;

Fig. 12 is a diagrammatic view of a modified current-collector having revolving commutator-segments and stationary brushes;

Fig. 14 is a vertical axial section of a current-collector having revolving segments and stationary brushes, provided with electromagnets for extinguishing the arcs;

Fig. 15 is a vertical axial section of a current-collector having revolving segments and stationary brushes, provided with gas-blast nozzles for extinguishing the arcs; and Figs. 16, 17 are a vertical axial section and a side elevation, respectively, of a current collector having revolving brushes and revolving gas-blast nozzles connected to a separate blower.

Figure 5:
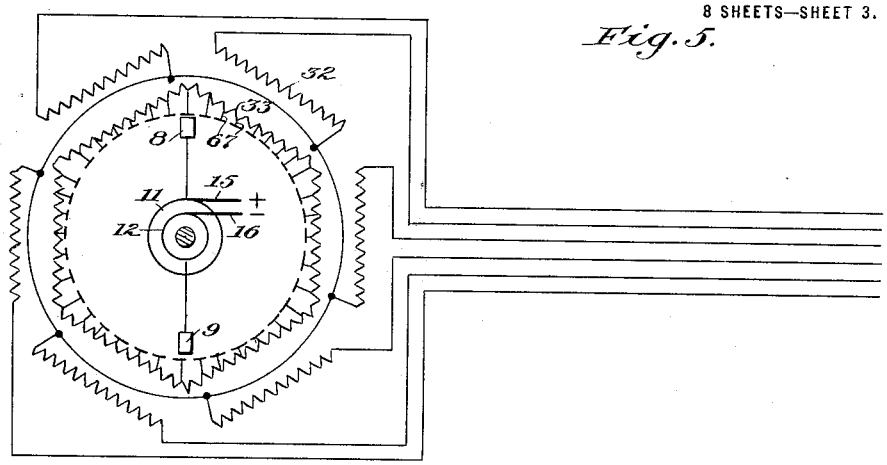
Fig. 5 is a diagrammatic view of a six-phase converter.
Figure 6:
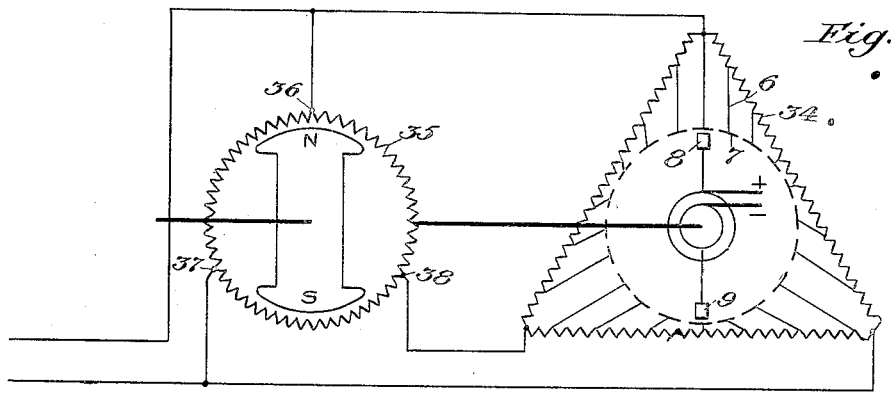
Fig. 6 is a diagrammatic view of a single-phase converter or rectifier, driven by a synchronous motor.

The converter shown in Fig. 1 comprises a three-phase transformer having delta-connected concentric closed windings 1, 2, the winding 1 having external leads 3, 4, 5, and the winding 2 having a series of spaced leads 6 extending to a circular row of separated commutator segments 7. Concentric to but spaced away from the segments are two brushes 8, 9, of opposite polarity, which are carried by a central revolving shaft 10. Upon this shaft and insulated therefrom are two collector-rings 11, 12, respectively connected to the brushes 8, 9 by wires 13, 14. Fixed brushes 15, 16, for receiving or delivering direct current, bear on these rings. The outer winding 1 may be omitted and the polyphase leads 3, 4, 5 delta-connected to the remaining winding 2, as indicated by the dotted lines 17, this winding then acting as an auto-transformer.

In the converter shown in Fig. 2 a single closed auto-transformer winding 18 is subdivided into six equal portions, opposite pairs of which are delta-connected in parallel to the three external polyphase leads 3, 4, 5, spaced leads 6′ also extending from different portions of the winding to the commutator segments 7. Two pairs of oppositely-disposed brushes, 8, 8′ and 9, 9′ are carried by a central revolving shaft 10′, the opposite brushes being of like polarity and the two pairs being respectively connected in parallel to collecting-rings 11′, 12′, on which bear brushes 15′, 16′.

The preferred current-collector is illustrated in detail in Figs. 3 and 4. Its two diametrically-opposite brushes 8, 8′ are fixed on a disk 19 of insulating material, carried by and rotating with the shaft 10′. These brushes are connected in parallel to a metal ring 11 carried by an insulating disk fixed on the shaft. Two oppositely-disposed brushes 9, 9′, of opposite polarity to the first pair, are also fixed on the disk 19, in positions ninety degrees therefrom, and are connected in parallel to a metal ring 12 carried by another insulating disk fixed on the shaft. Positive and negative brushes 15, 16, respectively, for receiving or delivering the direct current, bear on the rings 11, 12. The commutator segments 7 are secured on a flat ring 20 of insulating material, lying in the plane of the disk 19. The brushes and segments are inclosed by a box, comprising the disk 19 and ring 20, and a circular front-plate 21 of insulating material, with a rim 21′, extending over the ring 20.

An annular partition 22 extends rearwardly from the front-plate 21, subdividing the box into two concentric chambers. A pipe 23 extending through the plate 21 inside the partition serves to supply a pre-cooled inert or reducing gas, for example nitrogen, carbon monoxid or methane, which flows outward between the segments and brushes around the partition 22 and escapes to a suitable cooler and pump 24 through the pipes 25 outside the partition. Four fans 26, shown as rectangular curved funnels, are secured to the disk 19 in proximity to the brushes, in such position that the rotation of the disk causes the gas in the inner chamber of the box to pass into the wider end of the funnels and be delivered from their narrower ends just behind the brushes. These jets of cool inert or reducing gas flow through the open spaces between the segments 7 and the brushes and effectively extinguish any arcs which tend to persist after the brushes pass on. The ionized gas heated by the arcs flows outward between radial partitions 27 of fire-proof insulating material, for example mica, vulcabeston or bakelite, secured to the ring 21, being thereby subdivided into electrically-isolated portions, preventing the current from flashing across the segments. Other radial partitions 28 serve to similarly subdivide the heated gas flowing into the outer annular compartment of the box and thence escaping through the pipes 25 to the cooler. In practice, it is found that the arcs jumping between the brushes and segments very slightly burn or oxidize the metal thereof, the current flowing, in amperes, being small on account of the high voltage employed. The brushes may be adjusted inward toward the segments to compensate for any wear by shifting-collars 29 secured on the shaft 10′ by setscrews and rotating in contact with opposite sides of an apertured central boss 30 carried by a flanged metal disk 31 secured to the plate 20.

The six-phase converter illustrated in Fig. 5 has six separate primary windings 32 and six serially-connected secondary windings 33, in inductive relation with the primary windings and with equi-distant leads 6 and collector-segments 7. Revolving brushes 8, 9 of opposite polarity, rotating in synchronism with the phases of the six-phase generator, and spaced away from the segments 7, receive the currents arcing therefrom and deliver them to rings 11, 12 on which bear terminal brushes 15, 16. As the wave of induced E. M. F. traverses the coils, the direct current brushes 8 and 9 rotate in unison therewith, so as to collect current at predetermined points on the E. M. F. wave, thereby delivering unidirectional currents at a predetermined voltage.

The single-phase converter shown in Fig.

6 comprises a single three-phase winding 34, with spaced leads 6 and segments 7. The brushes 8, 9, spaced away from the segments, are driven by a synchronous motor 35. Single-phase current is fed to the winding of this motor at two points 36, 37, 120° apart, and three-phase current is taken from the winding at three points 36, 37, 38, 120° apart, the winding 35 thereby constituting an auto-transformer from single phase to three phase current.

Figure 7:
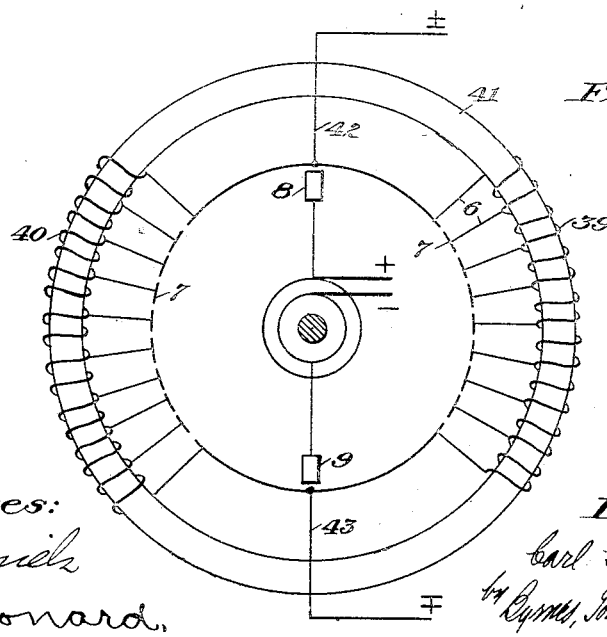
Fig. 7 is a diagrammatic view of a modified single-phase converter.

The single-phase converter shown in Fig. 7 comprises two windings 39, 40, oppositely-disposed on an iron ring-core 41. Current is supplied to the connected adjacent ends of these windings by leads 42, 43. Equi-distant taps 6 lead from the windings 39, 40 to the collector-segments 7, which deliver current as arcs to the revolving brushes 8, 9, traveling in unison with the cycles of alternating current, thereby maintaining predetermined positions on the E. M. F. wave.

Figure 8:
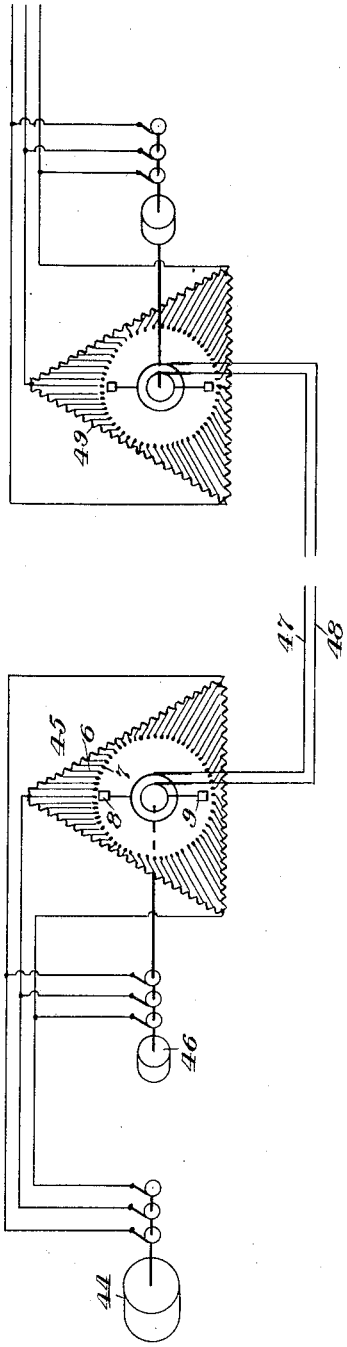
Fig. 8 is a diagrammatic view of a system for generating three-phase current, converting, transmitting, reconverting and delivering it at the original frequency and potential, comprising two converters, the first delivering and the second receiving direct current, both driven by synchronous motors.

Fig. 8 illustrates a system for transmitting three-phase current, including interconverting, without change in the frequency or potential. It comprises, at the transmitting station, a generator 44 and a converter 45 with a single closed winding, leads 6, collector segments 7 and revolving brushes 8, 9 driven by a synchronous motor 46, and collecting current at predetermined points on the E. M. F. wave. The direct current arcing to the brushes is transmitted over line wires 47, 48 to a converter 49 at the receiving station, which is identical in construction but reversed in operation to that at the transmitting station, re-converting the direct current into three-phase current.

Figure 9:
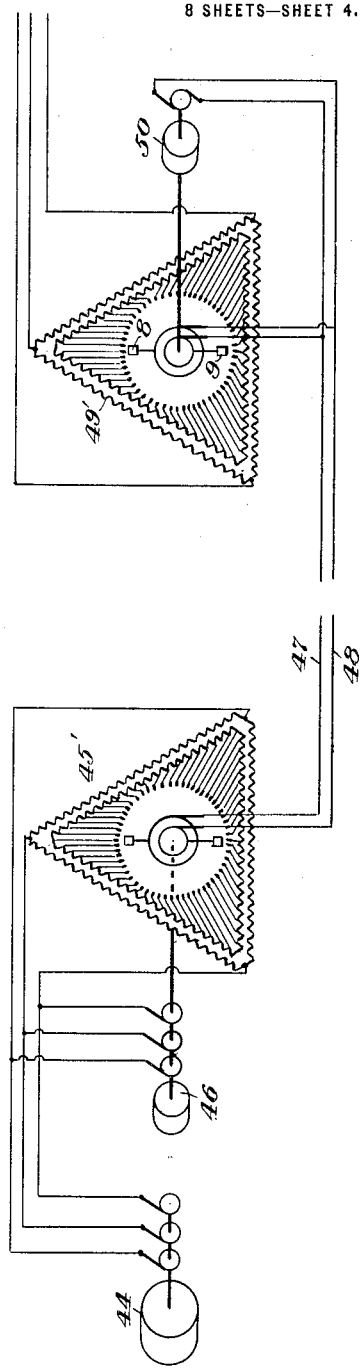
Fig. 9 is a diagrammatic view of a system for generating three-phase current, converting, transmitting, reconverting and delivering it at the original frequency and at any desired potential, comprising two converters, each with separate primary and secondary windings, the first delivering and the second receiving direct current.

Fig. 9 illustrates a system for transmitting three-phase current, including interconverting, which is identical with that shown in Fig. 8, except that the converters 45' and 49' at the transmitting and receiving stations, respectively, have separate primary and secondary windings. These windings enable the alternating current to be stepped up at the transmitting station and delivered to the line as high-potential direct current, which, at the receiving station, is re-converted into high-potential alternating current and stepped down to alternating current of the original or any desired potential. The brushes 8, 9 of the receiving converter are here driven by a direct-current motor 50.

The system for transmitting power illustrated in Fig. 10 comprises, at the transmitting station, a three-phase generator 44 delivering current to a double-wound step-up converter 45' driven by a synchronous motor 46. The high-potential direct current collected from the commutator of the secondary winding is transmitted over the line wires 47, 48 to a converter 51 having two windings, a primary 52, and a secondary 53, in mutual inductive relation. Each of these windings is connected by spaced leads to separate collectors having segments 7 and revolving brushes 8, 9, driven by a single shaft 54. The high-potential direct current distributed by arcs to the primary winding 52 induces alternating current of any predetermined potential in the winding 53, which is then converted into direct current of corresponding potential and delivered to the mains 55, 56. Shaft 54 may be driven by a synchronous motor 57 fed with current from the winding 53.

Fig. 11 illustrates a converter 59 constructed to receive direct current of any given potential and deliver direct current at any desired potential. It comprises a three-phase winding 60 from which equi-distant leads 61 extend outward to a circular series of external collector-segments 62, and from which equi-distant leads 63 extend inward to a circular series of internal segments 64. Revolving brushes 65, 66 of opposite polarity, carried by a shaft 67, are arranged in arcing proximity to the external segments, and revolving brushes 67, 68 of opposite polarity, carried by a shaft 69, are arranged in arcing proximity to the internal segments. The two shafts 67, 69 are in alinement and are adjustably connected, as to their relative angular position, by a coupling 70. Brushes 71, 72 bear on slip-rings 73, 74 connected to the internal brushes 67, 68, and brushes 75, 76 bear on slip-rings 77, 78 connected to the external brushes 65, 66. When the brushes 65, 66, 67, 68 are in alinement, as illustrated, and are driven by any suitable motor 79, direct current of any given potential supplied to either set of brushes 71, 72 or 75, 76 is distributed as arcs from brushes 67, 68, or 65, 66 to the adjacent segments 64 or 62, and is received by the winding 60 as three-phase current and producing therein a rotary magnetic field. From this winding it passes to the segments of the other current-collector and thence arcs to the other two brushes of opposite polarity. When the two sets of brushes 65, 66, 67, 68 are in alinement, the receiving brushes collect the current from the points of maximum potential in the winding 60. When these two sets of brushes are disalined by adjustment of the coupling 70, the receiving brushes are thereby brought in opposition to collector-segments connected with points of the winding 60 in which the potential wave is not at its maximum, and the potential of the direct current received and delivered is correspondingly decreased.

Fig. 12 illustrates a modified current-collector in which the segments 80 are carried by a revolving shaft 81, while the direct-current brushes 82, 83 of opposite polarity are fixed in arcing proximity to the segments. This arrangement necessitates the provision, on shaft 81, of a series of alined slip-rings 84, equal in number to and respectively connected by leads 85 to the several segments. A brush 86 bears on each slip-ring and spaced leads 87 connect therefrom to the secondary winding 88, of the converter. The primary 89 of the converter in this instance has terminals to receive three-phase current, and shaft 81 is driven by a synchronous three-phase motor 90.

Figure 13:
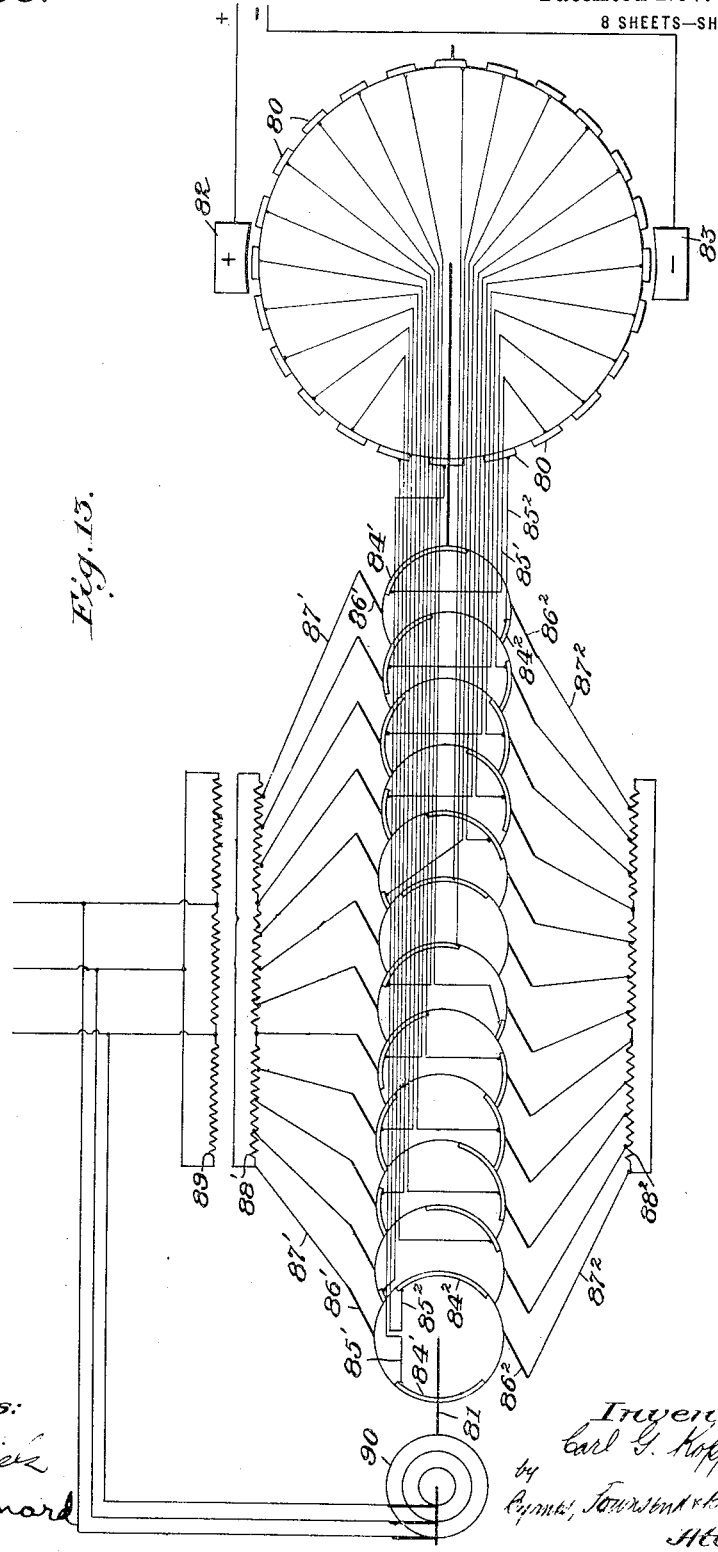
Fig. 13 is a diagrammatic view of a modified current-collector having revolving segments and stationary brushes, in which adjacent segments are connected in multiple, by slip-rings, from sections thereof to equipotential parallel windings.

Fig. 13 also illustrates a current-collector having revolving segments 80 carried by a shaft 81, and fixed direct-current brushes 82, 83. In this case, the converter has two secondary windings $88^1$, $88^2$, both in inductive relation to the primary three-phase winding 89, the winding $88^2$ being located in its present position to avoid confusion of circuits. Pairs of adjacent segments 80 are connected by leads $85^1$, $85^2$ to opposite revolving insulated contact-plates $84^1$, $84^2$, on which bear brushes $86^1$, $86^2$, respectively connected by spaced leads $87^1$, $87^2$ to the secondary windings $88^1$, $88^2$. Currents of the same potential induced in the two secondary windings are thereby carried to adjacent segments, and arc from both across to the brushes 82, 83, which are of sufficient length to cover a pair of segments.

Fig. 14 illustrates a current-collector of the revolving-segment type shown in Figs. 12, 13, in which electro-magnets 91 are provided to extinguish the residual arcs between the segments 80 and brushes 82, 83. These magnets inclose and have their pole-pieces in proximity to the opposite faces of the segments and brushes.

Fig. 15 also illustrates a current-collector of the revolving-segment type, in which nozzles 92 are arranged to deliver jets of air between the segments and brushes, to extinguish the arcs.

Figs. 16, 17 illustrate a current-collector of the revolving-brush type, like that shown in Figs. 1, 2, 3, 4, in which the shaft 10 carrying the brushes 8, 9 also carries an axially-arranged pipe 93 having branches 94, 95 with nozzles terminating in proximity to the segments and brushes. Compressed gas is supplied to revolving pipe 93 by a fixed pipe 96 entering its end and fed by a blower 97.

The transmission of power by the present process, in which alternating current, which may be generated at a moderate potential, is converted into direct current of high potential, transmitted as such over the lines and re-converted into alternating current, presents many advantages. It eliminates the undesirable transient phenomena which occur when high-potential alternating currents are transmitted; the maximum electromotive force is no greater than the effective one; and the transmission system is simplified, but two conductors being required instead of three or four, or but one line-wire if the earth is used as a return conductor. For short lines, the direct current may be transmitted at a moderate potential, by simply rectifying the alternating current from the generator. The current may be delivered at the receiving station as alternating current of any desired potential, frequency or number of phases, or as direct current of any potential.

The subject-matter of this application is partly disclosed in my copending application Ser. No. 646,988, filed August 31, 1911, now Patent 1,183,881, patented May 23, 1916.

I claim:

1. The process of interconverting high-potential alternating and direct electric currents, which consists in causing alternating currents to traverse a polyphase winding, and synchronously transferring unidirectional currents as arcs between successive portions of each phase of said winding and collectors.

2. The process of interconverting high-potential alternating and direct electric currents, which consists in causing polyphase currents to traverse a closed polyphase winding, and synchronously transferring unidirectional currents as arcs between successive portions of each phase of said winding and collectors.

3. The process of interconverting high-potential alternating and direct electric currents, which consists in causing polyphase currents to traverse a closed polyphase winding, synchronously transferring unidirectional currents as arcs between successive portions of each phase of said winding and collectors, and successively extinguishing said arcs.

4. The process of interconverting high-potential alternating and direct electric currents, which consists in causing polyphase currents to traverse a closed polyphase winding, synchronously transferring unidirectional currents as arcs between successive portions of each phase of said winding and collectors, and successively extinguishing said arcs by blasts of gas.

5. The process of interconverting high-potential alternating and direct electric currents, which consists in causing polyphase currents to traverse a closed polyphase winding, synchronously transferring unidirectional currents as arcs between successive portions of each phase of said winding and collectors, and successively extinguishing said arcs by blasts of cooled gas.

6. The process of interconverting high-potential alternating and direct electric currents, which consists in causing polyphase currents to traverse a closed polyphase winding, synchronously transferring unidirectional currents as arcs between successive portions of each phase of said winding and collectors, and successively extinguishing said arcs by blasts of a non-oxidizing gas.

7. The process of interconverting high-potential alternating and direct electric currents, which consists in causing polyphase currents to traverse a closed polyphase winding, synchronously transferring unidirectional currents as arcs between successive portions of each phase of said winding and collectors, and electrically isolating the portions of gas heated by the several arcs.

8. The process of interconverting high-potential alternating and direct electric currents, which consists in causing polyphase currents to traverse a closed polyphase winding, synchronously transferring unidirectional currents as arcs between successive portions of each phase of said winding and collectors, successively extinguishing said arcs by blasts of gas, and electrically isolating the portions of gas heated by the several arcs.

9. The process of interconverting high-potential alternating and direct electric currents, which consists in causing polyphase currents to traverse a closed polyphase winding, synchronously transferring unidirectional currents as arcs between successive portions of each phase of said winding and collectors, successively extinguishing said arcs by blasts of cooled non-oxidizing gas, and electrically isolating the portions of gas heated by the several arcs.

In testimony whereof I affix my signature in presence of two witnesses.

CARL G. KOPPITZ.

Witnesses:
J. W. BLACKBURN,
H. M. BRIGGS.